United States Patent
Kroyan et al.

(10) Patent No.: US 11,529,567 B2
(45) Date of Patent: Dec. 20, 2022

(54) ROBOT HAVING A CHANGEABLE CHARACTER

(71) Applicant: EVOLLVE, INC., Redondo Beach, CA (US)

(72) Inventors: Armen Kroyan, Redondo Beach, CA (US); Nader Hamda, Redondo Beach, CA (US); Ondrej Stanek, Redondo Beach, CA (US)

(*) Notice: Subject to any disclaimer, the term of this patent is extended or adjusted under 35 U.S.C. 154(b) by 151 days.

(21) Appl. No.: 16/730,632

(22) Filed: Dec. 30, 2019

(65) Prior Publication Data

US 2020/0129875 A1   Apr. 30, 2020

Related U.S. Application Data

(63) Continuation of application No. 16/067,997, filed as application No. PCT/US2017/012115 on Jan. 4, 2017, now Pat. No. 10,549,207.

(Continued)

(51) Int. Cl.
| | | |
|---|---|---|
| *A63H 11/00* | (2006.01) | |
| *A63H 3/28* | (2006.01) | |
| *B25J 9/16* | (2006.01) | |

(52) U.S. Cl.
CPC ............. *A63H 11/00* (2013.01); *A63H 3/28* (2013.01); *B25J 9/1697* (2013.01); *A63H 2200/00* (2013.01)

(58) Field of Classification Search
CPC ...... A63H 11/00; A63H 3/28; A63H 2200/00; A63H 5/00; A63H 29/22; B25J 9/1697;

(Continued)

(56) References Cited

U.S. PATENT DOCUMENTS

| | | | | |
|---|---|---|---|---|
| 5,607,336 A | * | 3/1997 | Lebensfeld | A63H 3/28 |
| | | | | 446/302 |
| 5,661,470 A | * | 8/1997 | Karr | G06K 19/0672 |
| | | | | 340/10.5 |

(Continued)

FOREIGN PATENT DOCUMENTS

| | | |
|---|---|---|
| CN | 1335800 A | 2/2002 |
| CN | 101801485 A | 8/2010 |

(Continued)

OTHER PUBLICATIONS

Notice of Reasons for Refusal of the Japanese Patent Office dated Oct. 20, 2020 for related Japanese Patent Application No. 2018-535350.

(Continued)

*Primary Examiner* — Bhavesh V Amin
(74) *Attorney, Agent, or Firm* — Hackler Daghighian Martino & Novak

(57) ABSTRACT

A character skin for a toy robot has an outer cover having an inner surface that is shaped to conform to an outer surface of a robot body housing of a self-propelled, toy robot. The outer cover can be fitted onto the robot body housing to cover an outer surface thereof and then removed from the housing, preferably with requiring a tool. The outer cover has an identification mechanism that provides an identification of a robot character software program, wherein the identification is electronically detected by the toy robot and in response the robot character software program is executed by the toy robot which changes behavior of the toy robot, whenever the outer cover is fitted onto the robot body housing. Other embodiments are also described and claimed.

7 Claims, 4 Drawing Sheets

Related U.S. Application Data

(60) Provisional application No. 62/275,684, filed on Jan. 6, 2016.

(58) Field of Classification Search
CPC ........ B25J 11/00; B25J 13/08; B25J 19/0025; B25J 19/0075
See application file for complete search history.

(56) References Cited

U.S. PATENT DOCUMENTS

| | | | | |
|---|---|---|---|---|
| 5,902,166 | A * | 5/1999 | Robb | F21V 33/008 |
| | | | | 446/485 |
| 6,089,942 | A * | 7/2000 | Chan | A63H 3/28 |
| | | | | 446/175 |
| 6,159,101 | A * | 12/2000 | Simpson | A63H 3/46 |
| | | | | 463/36 |
| 6,227,931 | B1 * | 5/2001 | Shackelford | G09B 5/02 |
| | | | | 446/268 |
| 6,253,058 | B1 * | 6/2001 | Murasaki | A63H 3/28 |
| | | | | 446/175 |
| 6,257,948 | B1 * | 7/2001 | Silva | A63H 3/46 |
| | | | | 446/301 |
| 6,290,565 | B1 * | 9/2001 | Galyean III | A63H 3/16 |
| | | | | 446/99 |
| 6,459,955 | B1 * | 10/2002 | Bartsch | G05D 1/0274 |
| | | | | 318/587 |
| 6,471,565 | B2 * | 10/2002 | Simeray | G06K 7/086 |
| | | | | 446/298 |
| 6,558,225 | B1 * | 5/2003 | Rehkemper | A63H 3/28 |
| | | | | 40/448 |
| 6,620,024 | B2 * | 9/2003 | Choi | A63H 30/04 |
| | | | | 446/175 |
| 7,066,781 | B2 * | 6/2006 | Weston | A63H 3/02 |
| | | | | 446/268 |
| 7,137,861 | B2 * | 11/2006 | Carr | G06F 3/002 |
| | | | | 446/298 |
| 7,384,325 | B2 * | 6/2008 | Kelly | A63H 3/36 |
| | | | | 446/268 |
| 7,488,231 | B2 * | 2/2009 | Weston | A63H 3/02 |
| | | | | 446/175 |
| 7,878,878 | B2 * | 2/2011 | Massaro | A63H 3/24 |
| | | | | 446/166 |
| 8,469,766 | B2 * | 6/2013 | Zheng | A63H 3/28 |
| | | | | 446/99 |
| 8,753,165 | B2 * | 6/2014 | Weston | A63H 3/00 |
| | | | | 446/175 |
| 9,126,122 | B2 * | 9/2015 | Boeckle | A61B 5/0002 |
| 9,480,929 | B2 * | 11/2016 | Weston | A63H 3/02 |
| 9,486,713 | B2 * | 11/2016 | Kroyan | B25J 9/1697 |
| 9,545,582 | B2 * | 1/2017 | Kroyan | G06F 3/041 |
| 9,737,808 | B2 * | 8/2017 | Andre | A63F 3/00643 |
| 10,155,172 | B2 * | 12/2018 | Kroyan | B25J 9/1697 |
| 10,549,207 | B2 * | 2/2020 | Kroyan | B25J 9/1697 |
| 10,792,578 | B2 * | 10/2020 | Su | A63H 3/005 |
| 2001/0049248 | A1 * | 12/2001 | Choi | A63H 30/04 |
| | | | | 446/298 |
| 2002/0177383 | A1 * | 11/2002 | Hornsby | A63H 3/48 |
| | | | | 446/175 |
| 2002/0183896 | A1 * | 12/2002 | Ogure | A63H 11/00 |
| | | | | 700/245 |
| 2004/0214642 | A1 * | 10/2004 | Beck | A63H 3/28 |
| | | | | 463/40 |
| 2004/0229696 | A1 * | 11/2004 | Beck | A63F 13/98 |
| | | | | 463/40 |
| 2005/0227577 | A1 * | 10/2005 | McRae | A63H 3/02 |
| | | | | 446/268 |
| 2006/0105671 | A1 * | 5/2006 | Connolly | A63H 3/006 |
| | | | | 446/485 |
| 2007/0128979 | A1 * | 6/2007 | Shackelford | A63H 3/365 |
| | | | | 446/484 |
| 2009/0033470 | A1 * | 2/2009 | Fu | A63H 11/00 |
| | | | | 340/539.1 |
| 2009/0117819 | A1 * | 5/2009 | Nakamura | A63H 3/28 |
| | | | | 446/297 |
| 2012/0295703 | A1 * | 11/2012 | Reiche | A63F 13/235 |
| | | | | 463/31 |
| 2013/0040530 | A1 * | 2/2013 | Matsuno | A63H 13/005 |
| | | | | 446/73 |
| 2013/0288563 | A1 * | 10/2013 | Zheng | A63H 30/04 |
| | | | | 446/268 |
| 2014/0274373 | A1 * | 9/2014 | Olshan | A63F 13/65 |
| | | | | 463/31 |

FOREIGN PATENT DOCUMENTS

| | | |
|---|---|---|
| CN | 102548624 A | 7/2012 |
| JP | 2001-191275 A | 7/2001 |
| JP | 2003-190662 A | 7/2003 |
| JP | 2005-013391 A | 1/2005 |
| JP | 4845229 B1 | 12/2011 |

OTHER PUBLICATIONS

Notification of First Office Action and Search Report of the China National Intellectual Property Administration dated Aug. 16, 2021 for related Chinese Application No. 202010542214.7.

* cited by examiner

ROBOT HAVING A CHANGEABLE CHARACTER

CROSS-REFERENCE TO RELATED APPLICATIONS

This patent application is a continuation application of U.S. patent application Ser. No. 16/067,997, which is a U.S. National Phase application under 35 U.S.C.§ 371 of International Application No. PCT/US2017/012115, filed on Jan. 4, 2017, entitled ROBOT HAVING A CHANGEABLE CHARACTER, which claims the benefit of U.S. provisional application No. 62/275,684, filed on Jan. 6, 2016.

An embodiment of the invention relates generally to a character skin for a toy robot, and more specifically for a self-propelled, autonomous toy robot that can move itself in a direction corresponding to a line that appears on a base surface on which the toy robot rests. Other embodiments are also described including a character skin for a toy robot that is not autonomous but rather fully remotely controlled.

BACKGROUND

A small toy robot (hand held) has been available for some time now that provides not only entertainment value but also can be used as an educational tool for children. The OZOBOT toy robot is a self-propelled, autonomous toy robot that can automatically detect and follow a line segment that appears on a base surface, including that of an electronic display screen. The line segment is automatically detected by the robot, and in response a propulsion subsystem is signaled to move the robot along the line segment, without requiring any communication with an external device to do so. The toy robot is programmable in that it can be instructed to respond in particular ways to particular color patterns that it detects. A software program editor running on a computing device such as a laptop computer or a tablet computer enables a user to create a block-based program which can then be loaded into memory within the toy robot. For example, if the robot detects a blue segment in the line, it can respond to the blue segment by, for example, moving forward five steps at a fast rate, whereas if it detects a yellow color it will move forward five steps but at a slow rate. In addition to simple movement, lighting effects may be controlled where light sources that are built into the housing of the toy robot can be controlled, timing of more complex movements, as well as loops that enable the robot to repeat certain patterns of movement or other behavior a predefined number of times until a certain event is detected. In addition to the educational aspects described above, the entertainment value provided by the toy robot may be enhanced, by providing a character accessory, which may be physically engaged with the robot body. A user's favorite movie or cartoon hero or other character may be depicted on a covering which fits over the housing of the robot body and stays coupled to the housing while the robot body moves.

SUMMARY

An embodiment of the invention is an autonomous toy robot whose behavior changes in accordance with the particular character skin that is fitted to a robot body housing. In one embodiment, the robot is autonomous in that it is preprogrammed to have certain behavior with an element of random decision-making; in another embodiment, the robot is merely a line follower; in yet another embodiment, the robot is fully remote controllable by a human user; in still further embodiments the robot is a swarm robot.

The robot's behavior includes actions that it takes in response to it detecting external stimuli, such as something that it detects using one or more built in sensors, e.g. a line, pattern, or contrast detected by line sensors, color detected by color sensors, objects in close proximity detected using IR-based proximity sensors and external communication detected via an RF antenna (e.g., a real-time user command received wirelessly from a remote control unit that is being operated by a human user of the robot, or from another nearby robot). These external stimuli may in a sense be overlaid on top of a base, autonomous behavior. For example, the base behavior may by to follow a line that is of uniform color; the external stimulus may be discontinuities in the line or color patterns within or adjacent to the line.

The character skin may have integrated therein intelligence, in the form of a programmable processor that will communicate with a processor in the robot body housing, once the skin has been fitted onto the housing. Alternatively, the character skin itself may not add any data processing capability to the robot, but may include items that are electronically controllable by the processor in the robot body housing, e.g., additional light sources, speakers, sensors (including a microphone or a camera, for example), actuators, and motors. A range of different character skins may be produced, from a simple or lightweight version that may only have an appearance of a character from a known or other original audiovisual work of art, to a fully loaded version that may have many "bells and whistles", and possibly even intelligence as mentioned above to effectively transform the toy robot into a more sophisticated machine.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
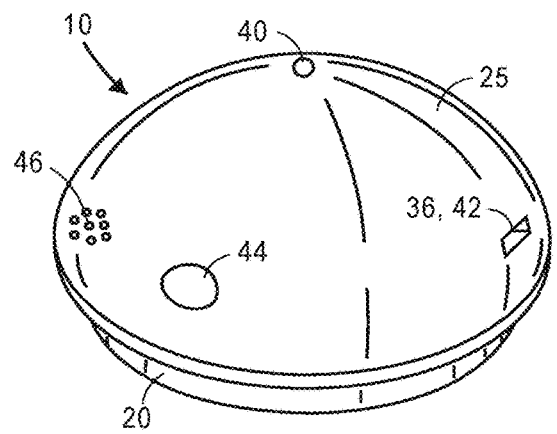
FIG. 1 is an upper perspective view of an embodiment of a toy robot.
Figure 2:
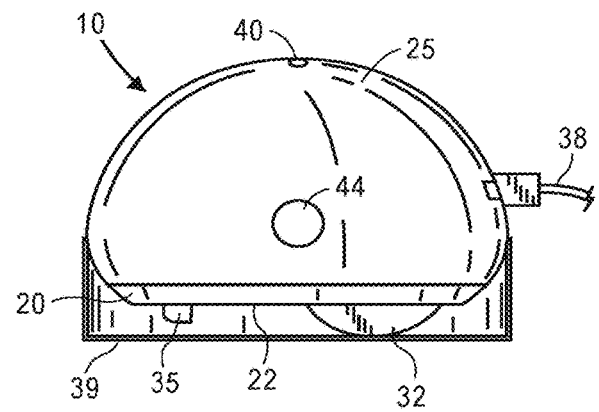
FIG. 2 is a side view of the toy robot of FIG. 1.
Figure 3:
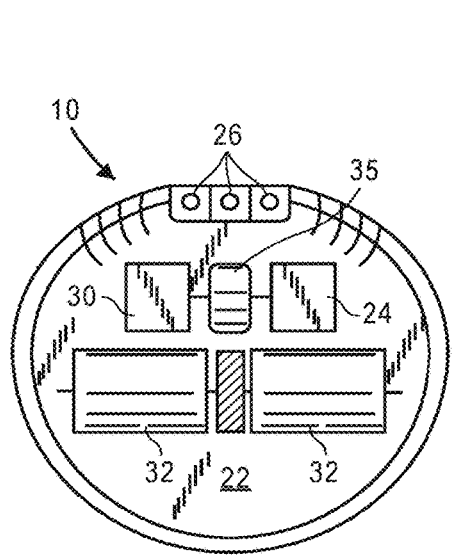
FIG. 3 is a bottom view of the toy robot of FIG. 1.
Figure 4:
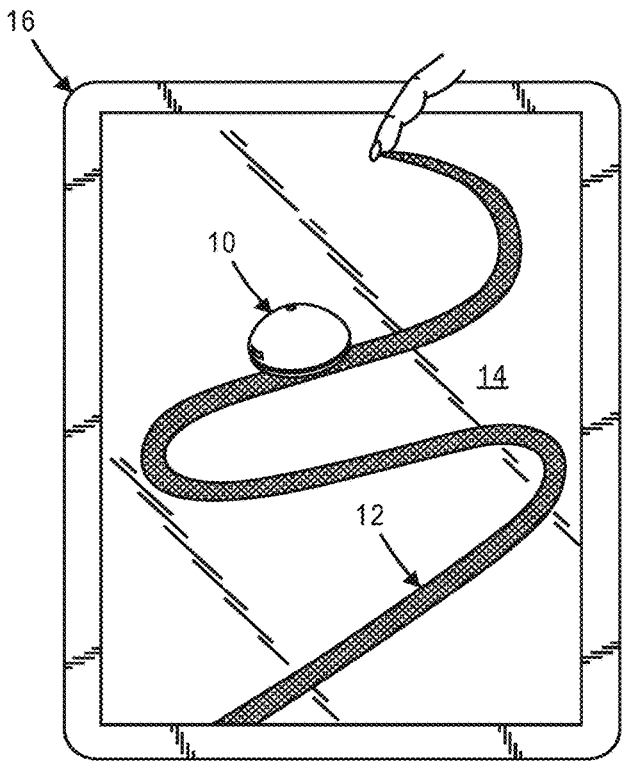
FIG. 4 is an upper perspective view of the toy robot of FIG. 1 as placed on a digital display screen face of a computing device, such as a tablet computer.

FIGS. 1-3 generally depict an embodiment of a self-propelled toy robot 10. In this example, the robot 10 is autonomous in that it can automatically follow a line segment 12 (see FIG. 4) that appears on a base surface 14. As described further below, a profile or character of such a toy robot 10 automatically changes, when a corresponding character skin is fitted to it. Note however that the line follower type of robot 10 being described here is just an example; the concept of a robot having a changeable character in accordance with any one of a number of character skins that can be fitted to it, is also applicable to other type of robots as mentioned above in the Summary section, e.g., a robot that is fully remote controllable by a human user, and a swarm robot.

Returning to FIGS. 1-3, the base surface 14 may be the face of an electronic display screen of a computing device 16 such as a tablet computer or a smart phone. Alternatively however, the base surface 14 may be that of the top of a table or desk or a sheet lying on the table or desk. The toy robot 10 may be used with base surfaces that emit light (such as that of a tablet computer) as well as base surfaces that do not emit light but that reflect, such as that of a table, desktop, counter or a sheet lying thereon. The base surface 14 can either be part of a self-emitting device, which emits light, or it may be part of a non-emitting object. In one embodiment, the toy robot 10 has both capabilities in that it can follow a line segment on both types of base surfaces 14 and can seamlessly transition while following a line, as it moves from one type of surface to another.

The toy robot 10 has a chassis 20 which may include a first surface 22 (an outer surface), and an opposing, second surface (an inner surface). When the robot 10 is disposed or placed on the base surface 14, the first surface 22 of the chassis 20 is located in spaced relation to the base surface 14, see for example FIGS. 6-9, and is oriented such that the first surface 22 is facing the base surface 14. Said another way, the base surface 14 lies underneath the chassis 20. As explained in more detail below, the robot 10 being "self-propelled" also includes a propulsion subsystem, which may include a movement mechanism 32 and a steering module 37 (see FIG. 5). In most instances two or more wheels are included which can be placed directly on the base surface 14 which then causes the first surface 22 to be spaced above the base surface 14 (again as shown in FIGS. 6-9).

The robot 10 additionally includes a housing 25 (also referred to as a robot body housing) that is coupled to the chassis 20. In one embodiment, the housing 20 has a generally rounded configuration, although other shapes are possible. The housing 25 and the chassis 20 together define an inner compartment which houses several of the electronic control and power components described below in connection with FIG. 5, including an electric power device 34, a control unit 28 having a programmed processor, an audio playback subsystem that includes a speaker 46, and a propulsion subsystem. The housing 25 and the chassis 20 may be fabricated from plastic, rubber or other materials commonly used for toys.

The toy robot 10 additionally includes a light meter 24 that is coupled to the chassis 20 and is oriented downward (or includes a mirror mechanism that allows a light sensor to "look" downwards), so as to detect light that is incident toward the first surface 22 of the chassis 20, that is upward, in order to for example determine a luminance level of the detected light. The light that is incident towards the first surface 22 may be light that has been emitted from a self-emitting base surface or it may be light that has been reflected from a non-emitting object (that makes up the base surface 14).

If the detected luminance level is too low, it may be difficult for the toy robot 10 to detect the line segment 12 on the base surface 14. As seen in FIG. 3, a light source 26 is provided on the chassis 20 for illuminating the base surface 14 (that is light emitted from the light source 26 is directed downward in a direction that is directly underneath the chassis 22). When the luminance level is too low, a programmed processor of the toy robot may decide to turn on the light source 26 so as to better illuminate the base surface 14 for making it easier to detect the line segment thereon. When the luminance level is above a sufficient level however, the programmed processor may decide to turn off the light source 26 so as not to emit any light, which helps avoid washing out the line segment that is being displayed by a self-emitting type of base surface 14.

In this regard, it is contemplated that a user may place the robot 10 on a self-emitting device to follow a line segment 12 depicted thereon. Subsequently, the user may lift the robot 10 from the self-emitting device and place the robot 10 on a non-emitting object to follow a separate line segment 12 depicted thereon. When the robot 10 is placed on the self-emitting device, the luminance level is typically above the threshold, and thus, the light source 26 is in the OFF state. However, when the user places the robot 10 on the non-emitting surface, the luminance level is typically below the threshold, and thus the light source 26 transitions to the ON state.

In the reverse scenario, i.e., when the robot 10 is lifted from a non-emitting object and placed on a self-emitting device, the light source 26 typically transitions from the ON state to the OFF state since the luminance level typically increases from below the threshold to above the threshold.

The light source 26 may include any lighting mechanism known in the art capable of providing sufficient light under the robot 10 for illuminating the line segment 12. In the exemplary embodiment depicted in FIG. 3, the light source 26 includes three light emitting devices (LEDs) positioned adjacent a peripheral portion of the chassis 20. However, the number and position of the LEDs or equivalent lighting mechanisms may be varied without departing from the spirit and scope of the present invention. For instance, some embodiments may include fewer than three LEDs, while other embodiments may include more than three LEDs.

According to one implementation, the threshold luminance is approximately equal to 80-120 nits, and preferably approximately equal to 100 nits. Therefore, in an embodiment wherein the threshold luminance is equal to 100 nits, if the luminance of the detected light is below 100 nits, the light source 26 will automatically be place in the ON state to produce and project light away from the first surface 22 and directly below, toward the base surface 14. However, if the luminance of the detected light at any time exceeds 100 nits, the light source 26 will automatically transition to the OFF state to cease light emission. Although the foregoing lists 80-120 nits as an exemplary threshold luminance range, those skilled in the art will readily appreciate that other embodiments may define the threshold luminance as being less than 80 nits or greater than 120 nits.

The programmed processor that controls the operation of the light source between its ON and OFF states may be part of a control unit 28 (see FIG. 5) that is coupled to the chassis and is in operative communication with the light meter 24 and light source 26.

The toy robot 10 further includes a line sensor 30 (see FIG. 3 and FIG. 5) that is coupled to the chassis 20 and is configured to sense a line segment 12 on the base surface 14. In one embodiment, the line sensor 30 may have sufficient resolution, e.g., it may be an imaging sensor pixel array that can detect edges of the line segment 12 but also other contrasting elements that appear on the base surface 14. The line sensor 30 is used by the processor to determine the boundary between the line segment 12 and the background color or background features, that also appear on the base surface 14. Here it should also be recognized that the line sensor 30 is configured to "look" downward, where this may involve the use of mirrors for example to reflect the light that is emitted from or reflected from the base surface 14 on to the imaging pixel array of the sensor 30.

Figure 5:
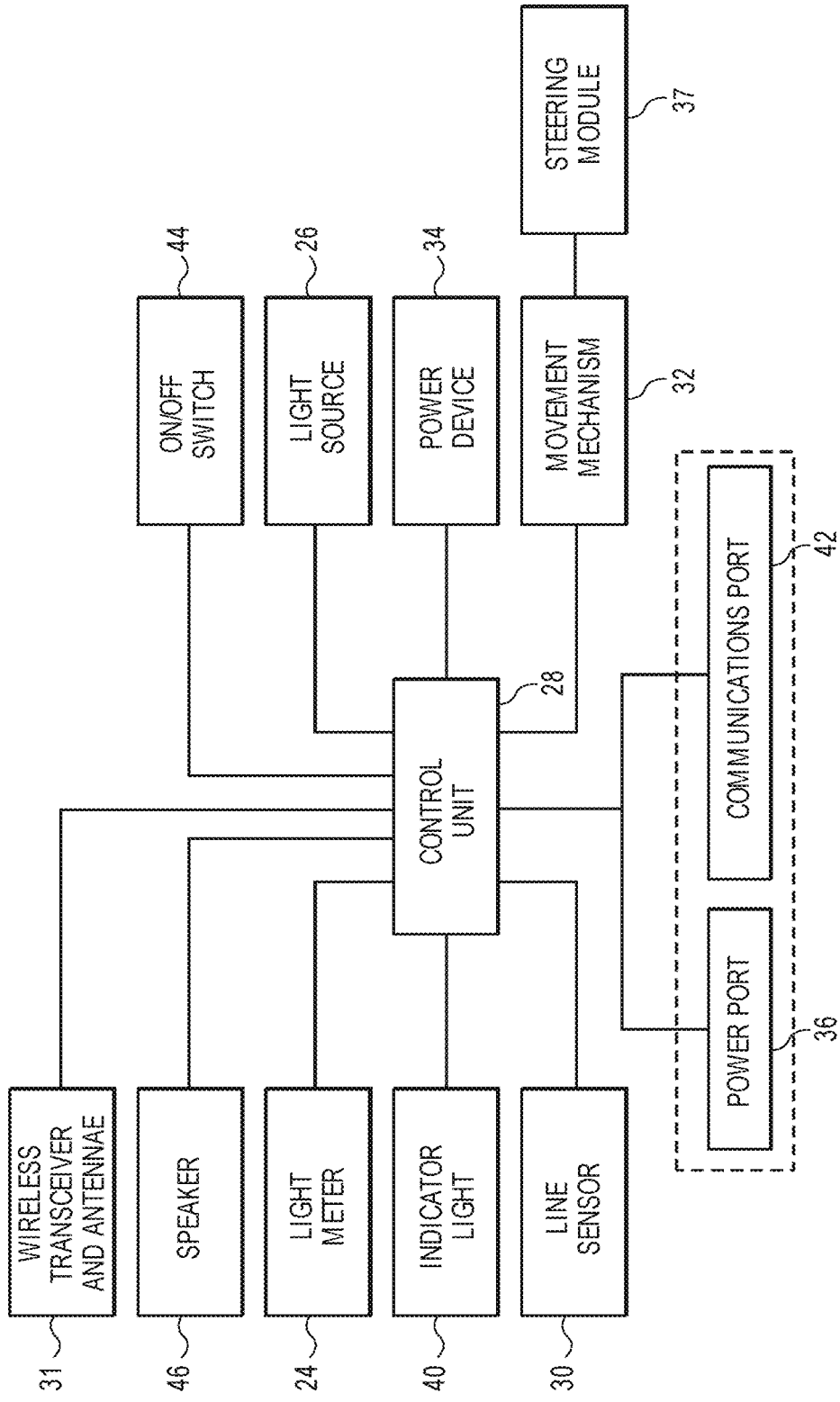
FIG. 5 is a block diagram of several electronic components that may be integrated into the toy robot or that may be part of an outer cover.
Figure 6:
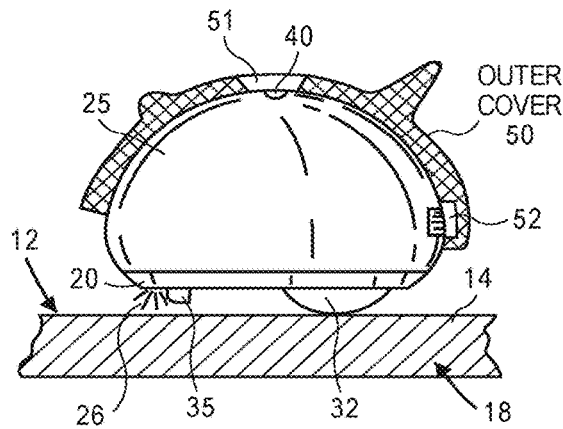
FIG. 6 is a side view of the toy robot of FIG. 1 fitted with an outer cover.
Figure 7:
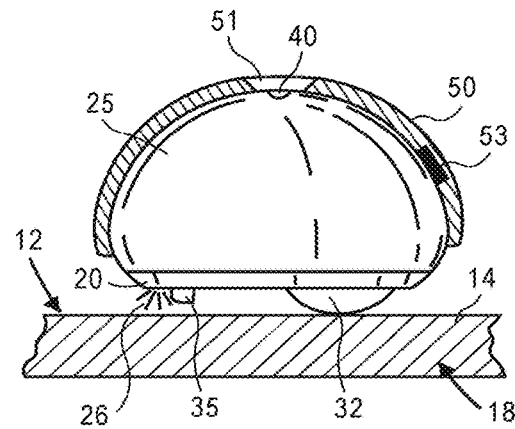
FIG. 7 shows the toy robot with another embodiment of the outer cover.

The toy robot also has a propulsion sub-system, which is depicted in FIG. 5 as a movement mechanism 32 and a steering module 37. The movement mechanism 32 is coupled to the chassis 20 and can be placed on the base surface 14. The programmed processor (not shown) in the control unit 28 is in operative communication with the line sensor 30 and the movement mechanism 32, so as to signal the movement mechanism 32 to cause the robot body housing to move in a pattern corresponding to the line segment 12 that is being sensed. The movement mechanism 32 includes at least one wheel and more likely two or more wheels, which are driven by a drive mechanism or motor. This may be a "wind up" type drive mechanism wherein a user winds a shaft or pushes the device in reverse to wind the drive mechanism. Alternatively, the drive mechanism may have an electrically powered motor. The chassis 22 may include an auxiliary support 35 (FIG. 2) for balancing the robot 10 as it moves, where the auxiliary support 35 may slide in contact with the base surface 14 if the robot 10 tips toward it.

The steering module 37 enables the robot 10 to rotate or turn (as needed to follow the line segment that is being sensed). The steering module 37 may include a wheel that is connected to a pivoting axle, or it may include a pair of wheels through which rotation is achieved by increasing power to one wheel while simultaneously decreasing power to the other wheel to create a differential. Other turning or steering mechanisms may also be employed. The steering module 37 is also communicatively coupled to the programed processor (in the control unit 28), and receives commands or signals to effectuate a turn or rotation.

As an alternative to the use of directly motorized wheels, other movement elements may be incorporated into the movement mechanism 32 including for example rotating tracks similar to a tank or articulated mechanisms. In a further embodiment, the propulsion sub-system may employ a propeller similar to a hovercraft, for pushing the robot forward.

The toy robot 10 also has a power device 34 such as an onboard battery that supplies power to the various electronic components depicted in FIG. 5 (including in some cases an electric motor that is part of the movement mechanism 32 of the propulsion sub-system). The power device 34 may include re-chargeable electrical energy storage elements including a battery and/or a super capacitor, but it may also include an energy harvesting mechanism such as photovoltaic cells.

Still referring to FIG. 5, the toy robot 10 may include a power port 36 that may include wiring and circuitry that is to be plugged into or otherwise wirelessly connected to an external power source (not shown), for recharging a rechargeable battery that may be part of the power device 34. The power port 36 may be a power supply bus interface that is integrated in the housing 25 and that is to connect with a counterpart bus interface of an external power source (not shown), such as an AC wall power adapter, to form a wired power supply link. The power port 36 may be part of, for example, a micro universal serial bus (USB) interface circuit which can receive a USB connector (not shown) for purposes of charging the power device 34. Other power ports having a configuration and size that are different than for example a micro USB port may also be used.

The toy robot 10 may additionally include an indicator light 40 coupled to the chassis 20 and in operative communication with the control unit 28. The indicator light 40 may be driven or configured to emit light signals representative of one or more operating conditions. For instance, the indicator light 40 may emit a first signal corresponding to the power level of the power device 34. For instance, the first signal may be brighter when the power level of the power device 34 is high, and dimmer when the power level of the power device 34 is low. Furthermore, the indicator light 40 may emit a second signal when the toy robot 10 is moving and a third signal when the toy robot 10 is stationary, wherein the second signal differs from the third signal. The second signal may include a blinking signal, wherein the frequency of the signal corresponds to the speed of the toy robot 10, i.e., as the robot 10 moves faster, the frequency increases, and vice versa. The third signal may be a constant signal, either constantly ON or OFF, to differentiate from the second signal. According to other implementations, the various signals emitted by the indicator light 40 may vary not only by frequency and brightness (as noted above), but also by color. In this regard, the indicator light 40 may include one or more light emitting devices (LEDs) capable of generating light in several different colors. More generally, the pattern of light produced by the indicator light 40 (also referred to here as the indicator light pattern) may be governed by or defined in the robot character software program (profile), where different profiles can be defined that have different indicator light patterns each being consistent with the particular character to which the profile is assigned.

The toy robot 10 may further include a communications port 42 for receiving programming instructions that configure the behavior of the robot (how it responds to external stimuli). These may be received from a programming device, such as a computer, smart phone, tablet computer or other programming devices known in the art. There may be several aspects of the toy robot 10 capable of being modified via these programming instructions. For instance, the signals emitted by the indicator light 40 (e.g., color, intensity, and any combination thereof including for example flashing patterns) may be changed or assigned via programming instructions. Furthermore, the preset time period at which the power device 34 ceases supplying power to the rest of the electronic components in the housing 25 (the robot "goes to sleep") may also be altered or modified through programming.

In one embodiment, the communications port 42 is a communications bus interface that is integrated in the housing 25 and together with the power port 36 forms part of a unified power and communications bus interface, again the example being a micro USB interface which has four pins or terminals in its connector or plug, two of them for power supply and two of them for two way communications. The combination of the power port 36 and the communications port 32 may be implemented using other power supply and communications bus interface technologies.

The control unit 28 including its programmed processor may be configured to perform an algorithm which governs the path that is chosen for the toy robot 10 to follow, as it senses a line segment. For instance, if the line segment 12 reaches an intersection or branches off to form a fork or "Y" in the line segment 12, the toy robot 10 may be programmed to automatically (without real-time user input) take a particular decision when in such a case there are two or more options, that is more than one line segment 12 which it may follow. As an example, the toy robot 10 may be programmed to randomly follow one of the line segment options. Alternatively, the toy robot 10 may be programmed to always turn right when possible, or always turn left when possible, or alternate between turning right and left. Furthermore, the toy robot may be programmed to go straight if possible, but if not then to either turn right or left. In another embodiment, the robot device may be programmed to reverse direction under certain conditions, for example, reaching the end of a line segment, or reaching an intersection. Such commands or rules for signaling the propulsion sub-system (movement mechanism 32 and steering module 37) in response to detecting an external stimulus (for example the line segment 12 on the base surface 14) may be viewed as part of the toy robot's "character", also referred to as its behavior.

The character or behavior of the robot may also be governed by its response to codes, which form part of the line segment 12 or are located adjacent to the line segment 12. For example, if the robot detects five blank boxes adjacent to each other or in a sequence, then this may be a rule for the robot to halt. If however only the left most box is filled in, this may be an instruction to take the left most turn when it reaches an intersection. If for example only the center left box is filled, the robot may take a fork to the left when it approaches a fork. Such specific commands are of course merely examples, and so the codes are not limited to any particular shape of boxes or colors that can be used as codes for eliciting certain movements or turns by the toy robot. For example, a yellow portion of a line segment may represent one command, while a red portion of a line segment may represent a second, different command.

The programmed processor (part of the control unit 28) is in communication with the line sensor 30, so that the control unit 28 effectively senses or reads the patterns that appear on the base surface 14, and in response, based on previously determined rules, will automatically generate signals to the propulsion sub-system so that the latter generates the needed force to move the robot body in a desired way. This software for recognizing the various optical commands using the line sensor 30 may be updated on the control unit 28 as needed, and may be part of a wider encompassing "robot character program" that configures the programmed processor to control behavior of the toy robot. The character of the robot may be changed by changing a robot character software program described below, which in turn changes the rules that govern how the robot reacts to detected codes, e.g., the speed, duration and specific movement pattern with which it reacts to a particular code that appears as an external stimulus.

Still referring to FIG. 5, the toy robot may also include, integrated within its housing 25, an audio playback sub-system that includes a speaker 46 which produces sound during operation of the toy robot 10. Although not explicitly shown, the audio playback sub-system would include for example as part of the control unit 28, an audio amplifier and a digital audio interface that will allow various forms of digital audio works to be played back through the speaker 46, including songs, speech, or simply alerts or short tones such as "beeps". Such audible information may be synchronized to correspond with the movement of the robot 10, for example the frequency of beeping may increase as the speed of the robot increases. Sounds may also be produced as a function of or in sync with the mode of operation, such as when turning left the robot 10 makes a different sound than when turning right. Thus, in addition to signaling the propulsion sub-system to move the robot body in a certain way, the programmed processor in response to detecting an external stimulus may also signal the audio playback sub-system to produce a particular sound. In one embodiment, all of this may be performed by the robot 10 automatically, as an autonomous toy robot, i.e., without waiting for an external real-time user command (e.g., from a remote control unit being operated by a user) to do so, reflecting the fact that the toy robot 10 in that case is an autonomous device.

The toy robot 10 adds an entertaining feature to the use of conventional screen-based devices such as smartphones and tablet computers, in that it provides a concrete, three-dimensional object which moves on the display surface of the smartphone or tablet computer, when a user is interacting with the smartphone or tablet computer to create a specific line segment 12 (shown on the display surface) for the robot to follow. The user is thus not solely engaged with the two-dimensional display screen of the smartphone or tablet computer, but is also engaged with a three-dimensional entertainment unit, which is a more interesting and challenging combination for the user especially a child.

The entertainment and education values provided by the toy robot 10 may be enhanced by the addition of a character skin. Referring now to FIGS. 6-9, these figures show various instances of the toy robot 10 fitted with an outer cover 50 whose inner surface is at least in part shaped to conform to part of an outer surface of the housing 25, so that the outer cover 50 cannot slide off, and remains attached or joined to the robot housing 25, as the latter is moving. The outer cover 50 can be fitted onto the housing 25 so as to cover an outer surface of the housing 25, but it can also be removed from the housing 25 thereby returning the toy robot 10 to its "base" condition or state, as depicted in FIGS. 1-2 for example.

Figure 8:
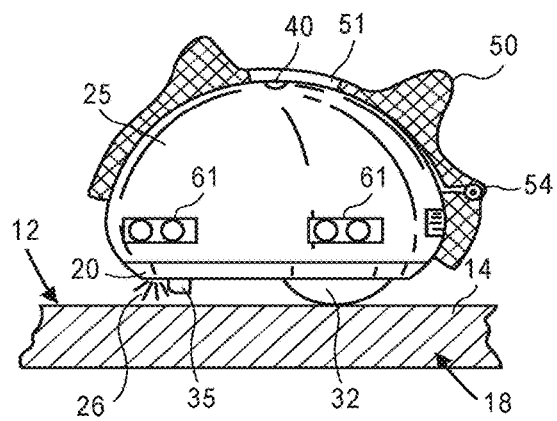
FIG. 8 shows yet another embodiment of the outer cover.

In a preferred embodiment, the outer cover 50 and the housing 25 of the robot body are designed such that the outer cover 50 can be fitted onto the housing 25 and removed from the housing 25 by a user without using any tool. In one embodiment, the outer cover 50 may be made of a resilient material such as plastic, rubber, silicone TPU, or TPE, that is able to stretch and is shaped so that the outer cover may be flexed but then allowed to retract and snugly fit, or even snap onto, the rigid outer surface of the housing 25. As seen in the embodiment of FIG. 8, one or more portions of the outer cover 50 may be hinged relative to another portion (here using a hinge 54) so that for example one portion of the outer cover may be pivoted relative to the other as in a clamshell type of movement. The outer cover 50 may also be composed of several parts that snap or otherwise connect together, e.g., a soft portion that fits onto a top portion of the body housing 25 and that has several snap-on joints for receiving the character's head and arms.

FIGS. 6-9 depict a self-propelled, autonomous robot body having the housing 25 in which the electrical power device 34, primary electronics (including a processor and its program memory as part of the control unit 28), an audio playback sub-system (including the speaker 45), together with a propulsion sub-system are integrated, where these operate together so that the programmed processor can detect an external stimulus using a sensor (e.g., the line sensor 30, or an RF module 31 having an antenna and an associated wireless transceiver—see FIG. 5.) Examples of the external stimulus include the line segment 12 on the base surface 14 (see FIG. 4), a real-time user command received wirelessly (by the RF module 31) from a remote control transmitter that is being operated by a human user, or a command or control signal received wirelessly (by the RF module 31) from another robot nearby. The nearby robot may have been "detected" by the toy robot 10 using any combination of its available built-in sensors (e.g., a infrared proximity sensor or the RF module 31).

In response to detecting an external stimulus, the programmed processor in the housing 25 of the toy robot 10 can automatically signal the propulsion sub-system to generate force so as to move the robot body, and/or the audio playback sub-system to produce sound. This behavior of the toy robot, namely its signaling of the propulsion sub-system or the audio playback sub-system or even as explained above, the signaling of the indicator light 40, or more generally its response to a detected external stimulus, is part of the character of the robot, which is governed by a robot character software program (also referred to as a profile). The profile had been previously downloaded as programming instructions for the processor, and is stored as part of the control unit 28 (e.g., within non-volatile memory such as flash memory).

Operation of the toy robot 10 having a changeable character may be as follows. When the primary electronics (including the control unit 28) detects an identification (ID) in response to the outer cover 50 being fitted onto the housing, the programmed processor, which is controlling the behavior of the toy robot 10, becomes automatically reconfigured in accordance with a robot character software program that has been assigned to the detected identification, such that the behavior of the robot (its responses to specific external stimuli) is changed to be in accordance with the robot character software program. In other words, the new "character" of the toy robot 10 immediately and automatically comes to life once the outer cover 50 is fitted to the housing 25, resulting in the base behavior of the robot being modified or transformed to be consistent with that of its new character.

Figure 10:
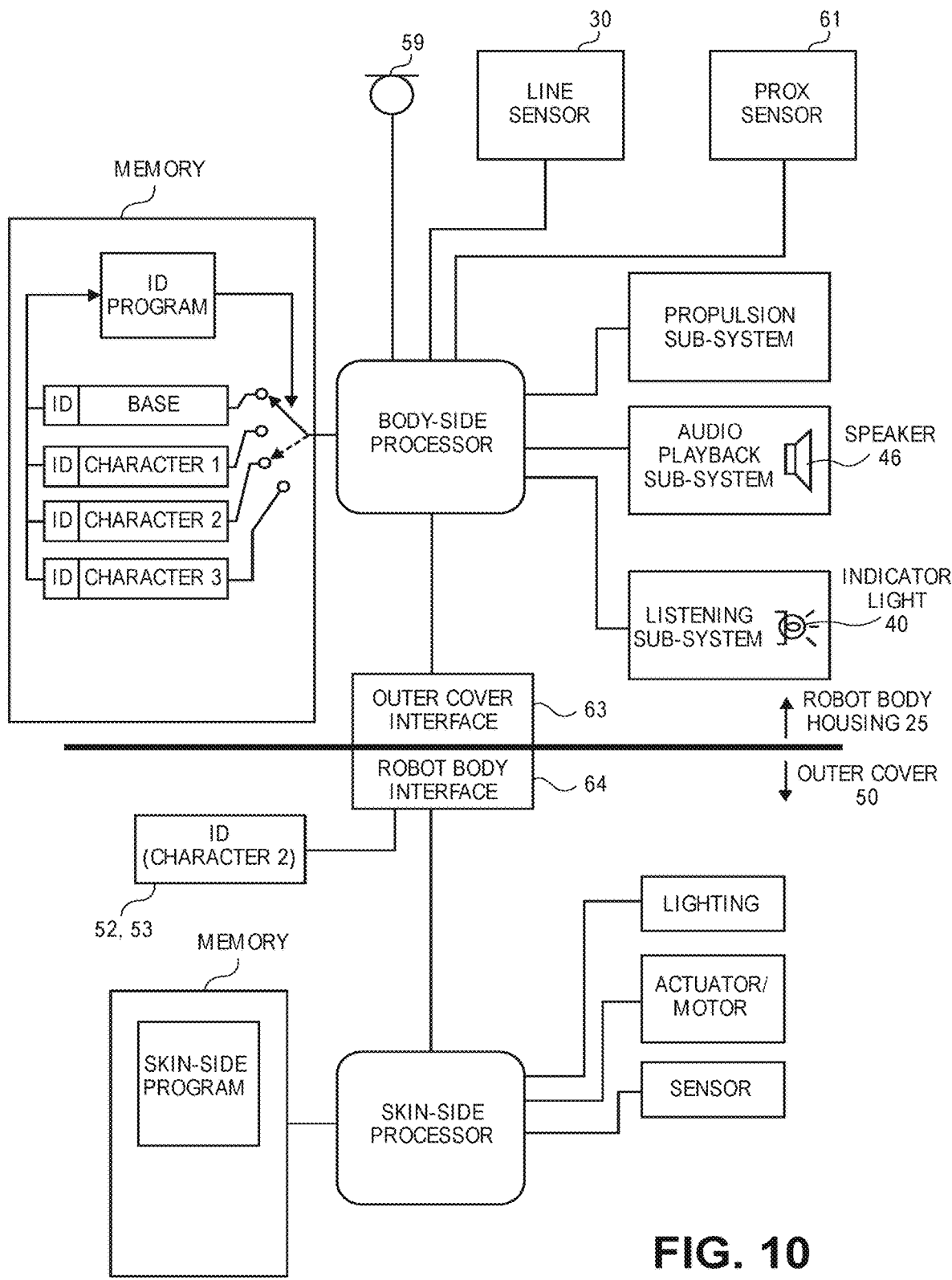
FIG. 10 is a block diagram of electronic components of a toy robot that can have a changeable character, and its outer cover.

Referring to FIG. 10, this figure illustrates a block diagram of hardware components that are within the robot body housing 25, for the embodiment where an outer cover 50 can be fitted onto the housing 25 in order to change the behavior or character of the toy robot 10. A body-side processor (within the control unit 28) is to be programmed to perform the various functions described above, including detecting identification of the outer cover 50 (by the instructions provided in an identification, ID, program stored in memory). The ID program may be invoked when or in response to an outer cover 50 being fitted. The resulting detected identification causes a particular one of several available robot character software programs or profiles (also stored in the memory) to be selected in accordance with which the processor will become reconfigured to change the behavior of the toy robot 10.

Each robot character software program or profile stored in the memory is assigned a separate or unique ID. The processor while executing the ID program may compare the stored IDs to a detected ID to find a match. In other words, the ID program may compare the detected ID to those of the various stored robot character software programs in order to then select the matching character from amongst several that are available (e.g., base, character 1, character 2, character 3) with which the processor will be configured.

In one embodiment, the primary electronics within the housing 25 (using the control unit 28) detects the identification of the outer cover 50 via radio data communication with the outer cover 50. This embodiment is exemplified in FIG. 7 where the outer cover 50 has embedded therein a tag 53 that is suitable for RF identification (RFID), where the housing 25 contains a corresponding RFID reader (not shown) that will detect the identification which has been encoded into the tag 53. As an alternative, the primary electronics can detect the identification via a wired, electrical current path with the outer cover 50. That embodiment is exemplified in FIG. 6 where a coded passive resistor 52 is integrated into the outer cover 50 and whose resistance is measured once it makes contact with a pair of terminals that are exposed in the housing 25 directly beneath. Detection of the ID of the outer cover 50 may be performed by the processor through any of the available aforementioned hardware features, collectively referred to in FIG. 10 as an outer cover interface. Examples given above are either a wired electrical current path (e.g., to a coded, passive resistor within the outer cover 50) or via radio data communication with the outer cover 50 (e.g., RFID). Note that the outer cover interface may be more complex, and may also include a serial communications bus interface as well as a power supply bus interface through which electrical power device 34 within the housing 25 can deliver power to various electronics (also referred to here as secondary electronics) that is within the outer cover 50.

As depicted in the block diagram of FIG. 10, the robot character software programs or profiles (identified in the example here by four IDs, base, character 1, character 2, and character 3) may be previously downloaded and stored within non-volatile memory, within the housing 25 of the robot body These can also be automatically updated to the latest version that is available in a remote server, whenever the robot is provided a connection to the Internet (via the communications port 42 or via a separate wireless digital communications interface, e.g., a wireless local area network interface within the housing 25). In this way, the latest version of a profile is ready to be "brought to foreground" whenever a corresponding outer cover 50 has been fitted to the housing 25.

Referring back to FIGS. 6-8, in these embodiments, the outer cover 50 has a portion 51 that may cover or align with a sensor (emitter and/or detector) within the housing 25, or as shown in FIGS. 6-8, the indicator light 40. The portion 51 is designed to be sufficiently translucent, or is a cutout or opening, through which light used by the sensor or produced by the indicator light 40 can pass so as to enable the sensor to continue functioning or to enable the indicator light 40 to be visible, even though the housing 25 is covered by the outer cover 50. Examples of such sensors that may be integrated within the housing 25 and that should be aligned with the portion 51 directly above it include an infrared sensor and an ambient visible light sensor.

Figure 9:
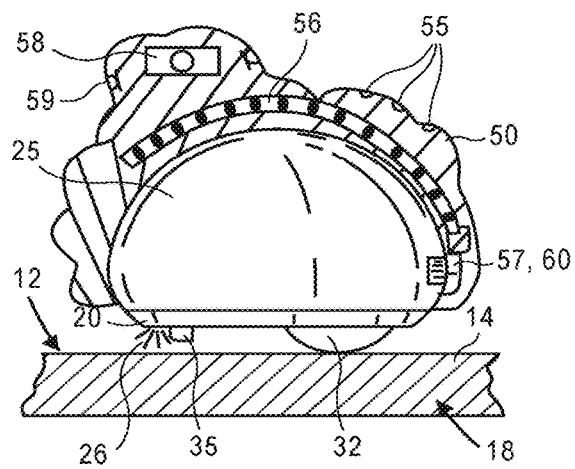
FIG. 9 shows still another embodiment of the outer cover.

In a further embodiment, referring now back to FIG. 9 and FIG. 10, the outer cover 50 may have intelligence built-into it, in the form of a "skin-side processor" that may be a programmed processor (on a printed circuit board assembly that is integrated within the outer cover 50). The skin-side processor may be designed to communicate with the processor that is in the robot body (the "body-side processor"), so as to give the toy robot 10 a more complex behavior. To enable this, the robot body housing 25 includes a serial communications interface and a power supply bus interface, integrated in the housing 25, which are to connect with a counterpart bus interface in the outer cover 50 referred to as a robot body interface 64 (see FIG. 10), to form a wired communications link and a wired power supply link. Thus, as seen in the example of FIG. 9, the outer cover 50 has integrated therein a serial communications bus interface 57 and a power supply bus interface 60 which are to make conductive contact (e.g., via four pins, such as the arrangement described in the micro USB specification) with corresponding pins of a wired version of the counterpart, outer cover interface 63 in the housing 25 (once the outer cover 50 has been fitted onto the robot body housing 25). In such an embodiment, the outer cover 50 could alternatively have less flexible or less powerful data processing capability, in the form of for example a state machine or other control logic (not shown) that is also coupled to the communications and power supply bus interfaces 57, 60. In the case described above where the outer cover 50 is composed of several elements that are attached together, one of these elements (such as the head of the character) could house the electronic components that provide the skin intelligence while the other elements (such as the arms) may be purely decorative.

Once the processor has been configured in accordance with a selected profile (robot character software program), the processor may respond to external stimuli which it detects through any one of various mechanisms, including the line sensor 30, a proximity sensor 61 (which includes an emitter and a detector, for example an infrared emitter and complimentary infrared detector), the RF module 31, or one or more microphones 59. The microphone 59, the line sensor 30, and the proximity sensor 61 may be integrated within the housing 25—see FIG. 8 in which the robot housing body 25 includes a pair of proximity sensors 61. Note in that case that the outer cover 50 may need to have several "clear" portions 51 each being located directly above or aligned with each proximity sensor 61, in order to allow the infrared light used by the proximity sensors 61 to be properly emitted and detected.

In another embodiment, once the processor has been configured with a particular profile (robot character software program), that profile may also include definitions for electrically controllable items that are integrated within the outer cover 50, and which can be accessed by the body-side processor through the communications interface 57 of the outer cover interface 63. For example, referring now to FIG. 9, the outer cover 50 may include a light source 55 and associated driver circuitry (e.g., light emitting diodes and associated LED driver circuits), in addition to of course control logic that is coupled to the driver circuitry. In that case, the processor within the robot body housing 25 can send commands through the outer cover interface 63 and in this particular example the serial communications interface 57 (see FIG. 9) to for example control the color or intensity of the light source 55. More generally, the light source 55 may have multiple segments, or it may have multiple elements (e.g., LED elements) of which the control logic that is integrated in the outer cover 50 is aware of, such that light control commands that are intended for a particular segment or elements of the light source 55 can be recognized (as they are received from the processor of the robot body housing 25) and then translated into lower level drive signals (e.g., a pulse width modulated LED drive signal that controls output intensity of an LED source in the outer cover 50).

In another embodiment, the outer cover 50 includes a sensor that is integrated in the outer cover 50 and powered through the power supply link offered by the power supply bus interface 60. Examples include a proximity sensor, and a digital camera 58 as shown in the drawings. The control logic of the digital camera 59 within the outer cover 50 can receive commands from the programmed processor in the robot body housing 25, for controlling operation of the digital camera 58, and it can also send captured digital images to the programmed processor in the robot body housing 25, through the communications link offered by the communications bus interface 57. More generally, the control logic of a sensor in the outer cover 50 may receive commands from the body-side processor for reading output data of the sensor (through the communications interface 57).

In yet another embodiment, the outer cover 50 may include one or more microphones 59 (e.g., multiple microphones operating as a microphone array) that are coupled to analog to digital conversion circuitry (ADC) also within the outer cover 50, so that a captured digital audio stream can be sent through the communications link formed by the serial communications bus interface 57 and its counterpart within the housing 25, to the programmed processor in the housing 25.

In a further embodiment, also depicted in FIG. 9, the outer cover 50 has a battery 56 that is integrated therein and that is coupled to the wired power supply link offered by the power supply bus interface 60 and its counterpart in the housing 25, so that power can be supplied to the primary electronics that is within the robot body housing 25. As suggested above, an alternative to the battery 56 may be an energy harvesting unit (not shown) that is integrated within the outer cover 50, e.g., photovoltaic cells, which is another way to supply power from the outer cover 50 to the primary electronics in the robot body housing 25.

In still another embodiment, the outer cover 50 may include an actuator or a motor (with associated driver circuitry), control logic coupled to the driver circuitry, and wherein the driver circuitry and the control logic are powered through the power supply link offered by the power supply bus interface 60 of the outer cover and its counterpart within the robot housing 25. The control logic receives commands from the programmed processor in the housing 25, through the wired communications link offered by the serial bus communications interface 57, for effecting movement of the actuator or control of the motor. In one embodiment, the outer cover 50 has a propeller mechanism that is driven by the motor, which may enable the toy robot 10 to fly, under control of the programmed processor within the housing 25.

In one embodiment, the outer surface of the outer cover 50 may have two-dimensional artwork, or three-dimensional artwork (sculpture), that gives the visual appearance of a character or profile that has been either created by the end user or that has been created by another entity (who has authored an audiovisual work of art in which the character is depicted). The character may be a hero or villain, in a motion picture film, a television series, or a video game. The two-dimensional or three-dimensional artwork, which presents an appearance similar to that of the character, may thus be licensed from such an entity.

In one embodiment, the toy robot 10 is given a voice (played through the speaker 46) that is unique to its present character skin (outer cover 50). In one embodiment, the different robot character software programs have electronically defined different voices, respectively, corresponding to their respective characters. The voice may be a synthesized voice that has been authored by the end user of the toy robot 10 or by another user, and parameters or data for such a synthesized voice may have been previously generated and stored within the non-volatile memory of the control unit 28 (as associated with its respective robot character software program.) A voice of the robot may alternatively be closely based on a previously recorded voice of a human that has been recorded and stored in an audio file (as part of a robot character software program.) Thus, in addition to exhibiting a characteristic movement, the toy robot 10 may, once fitted with a given outer cover 50, have a particular voice produced by the speaker 46 that is unique to its present outer cover 50.

A further aspect of the character changeable toy robot 10 is to have a lighting sub-system (including the light source 26) that is configured to produce light that reflect a given character of the robot, in accordance with a unique combination of colors or patterns for the given character. In that case, the robot character software program may include a data structure that defines a particular combination of colors or patterns for the lighting sub-system of the toy robot 10.

Thus, the character software program may define a unique combination of colors or patterns for the lighting sub-system, a particular synthesized voice file or selected audio files for the robot's voice and a definition of a particular movement pattern, such that the toy robot 10 may now express emotion or respond in several different dimensions including sound, lighting, and movement (in response to any external stimulus that it detects).

In a further embodiment of the invention, the primary electronics within the housing 25 of the toy robot 10 detects increased proximity with another toy robot 10 (e.g., using the proximity sensor 61 in combination with another sensor such as an RFID reader-tag combination). The other toy robot is also fitted with an outer cover that is associated with a particular robot character or profile, and where this robot character can also be detected (e.g., using the RFID capability, assuming that the other toy robot also has an RFID tag in which its identification has been coded). In response to this "encounter," the programmed processor of the toy robot 10 can become reconfigured in accordance with a number of rules that define its interaction with the other toy robot. These rules are different depending upon the identification (which is resolved into a character or profile) of the other toy robot that has been encountered. The robot can optionally be able to automatically detect that a character of the nearby robot is in the same "family" as its present character, or not in the same family, and can then interact with the other toy robot, differently depending on its character, e.g., voice response, visual response including movement of parts, movement of the body. As an example, the voice of the robot may be modified by these rules, such that a deeper voice is selected in some cases, and a higher pitched voice is selected in other cases. As an alternative or in addition, the lighting sub-system may be controlled differently so that for example the indicator lights 40 have a particular color combination and have greater intensity in some cases, and in other cases those indicator lights 40 are illuminated less intensely and/or at a different color. The programmed processor may revert back to a base set of rules once the toy robot 10 finds that it is no longer in proximity of the other toy robot.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, both the power port 36 and the communications port 32 may be of the wireless variety, where for example power is transferred from an external power source to the power device 34 via inductive charging, while digital communication signals are transmitted and sent to an external device using a wireless link (e.g., a Bluetooth communication protocol). The description is thus to be regarded as illustrative instead of limiting.

What is claimed is:

1. An autonomous toy robot comprising:
a self-propelled robot body having a housing in which primary electronics that includes a programmed processor is integrated,
wherein the primary electronics is to detect an identification in response to an outer cover being fitted onto the housing, and
wherein in response to the identification being detected, the programmed processor becomes re-configured in accordance with a robot character software program that is assigned the identification, to change behavior of the robot;
wherein the primary electronics comprises memory in which there are stored a plurality of robot character software programs or profiles that are each assigned a different identification,
wherein the plurality of robot character programs re-configure the programmed processor to control behavior of the robot so as to be consistent with that of a plurality of different robot characters, respectively,
wherein the primary electronics detects an identification in response to an outer cover being fitted onto the housing, performs a look up in said memory to find the detected identification, and re-configures the programmed processor with the robot character software program that is assigned to the detected identification; and
wherein the primary electronics also includes a propulsion sub-system, wherein one of the plurality of robot character software programs has been authored in part by an end user of the toy robot and includes i) an audio data file that contains a recording of the end user's voice or audio that has been synthesized according to instructions from the end user, ii) a movement control data structure that defines a plurality of groups of commands wherein each group of commands will cause the propulsion sub-system to generate forces so as to move the robot body.

2. An autonomous toy robot comprising:
a self-propelled robot body having a housing in which primary electronics that includes a programmed processor is integrated, wherein the primary electronics is to detect an identification in response to an outer cover being fitted onto the housing, and wherein in response to the identification being detected, the programmed processor becomes re-configured in accordance with a robot character software program that is assigned the identification, to change behavior of the robot;

wherein the primary electronics comprises memory in which there are stored a plurality of robot character software programs or profiles that are each assigned a different identification, wherein the plurality of robot character programs re-configure the programmed processor to control behavior of the robot so as to be consistent with that of a plurality of different robot characters, respectively, wherein the primary electronics detects an identification in response to an outer cover being fitted onto the housing, performs a look up in said memory to find the detected identification, and re-configures the programmed processor with the robot character software program that is assigned to the detected identification; and wherein one of the plurality of robot character software programs has been authored in part by an end user of another toy robot who has decided to share his robot character software program with other end users.

3. An autonomous toy robot comprising:

a self-propelled robot body having a housing in which primary electronics that includes a programmed processor is integrated, wherein the primary electronics is to detect an identification in response to an outer cover being fitted onto the housing, and wherein in response to the identification being detected, the programmed processor becomes re-configured in accordance with a robot character software program that is assigned the identification, to change behavior of the robot;

wherein the primary electronics comprises memory in which there are stored a plurality of robot character software programs or profiles that are each assigned a different identification, wherein the plurality of robot character programs re-configure the programmed processor to control behavior of the robot so as to be consistent with that of a plurality of different robot characters, respectively, wherein the primary electronics detects an identification in response to an outer cover being fitted onto the housing, performs a look up in said memory to find the detected identification, and re-configures the programmed processor with the robot character software program that is assigned to the detected identification;

wherein when the primary electronics detects a first robot character in response to increased proximity with a first toy robot that is fitted with a first outer cover, the programmed processor becomes re-configured in accordance with a first plurality of rules for interaction with the first robot character, and wherein when the primary electronics detects a second robot character in response to increased proximity with a second toy robot that is fitted with a second outer cover, the programmed processor becomes re-configured in accordance with a second plurality of rules for interaction with the second robot character, wherein the first and second plurality of rules are different.

4. A character skin for a toy robot, comprising:

an outer cover that can be fitted onto a robot body housing of a self-propelled toy robot and then removed from the housing, the outer cover includes an identifier that provides an identification of a robot character software program, wherein, when the outer cover Is fitted onto the robot body housing, the toy robot electronically detects the identification and executes the robot character software program which changes behavior of the toy robot;

wherein the outer cover further comprises a digital camera;

a serial communications and power supply bus interface integrated in the outer cover that is to connect with a counterpart bus interface in the robot body housing to form a wired communications link and a wired power supply link, when the outer cover has been fitted onto the robot body housing; and control logic coupled to the digital camera and to the bus interface integrated in the outer cover, wherein the digital camera and the control logic and circuitry of the bus interface in the outer cover are powered through the power supply link, and wherein the control logic receives commands from a programmed processor in the robot body housing, for controlling operation of the digital camera, and sends captured digital images to the programmed processor in the robot body housing, through the communications link.

5. A character skin for a toy robot, comprising:

an outer cover that can be fitted onto a robot body housing of a self-propelled toy robot and then removed from the housing, the outer cover includes an identifier that provides an identification of a robot character software program, wherein, when the outer cover Is fitted onto the robot body housing, the toy robot electronically detects the identification and executes the robot character software program which changes behavior of the toy robot;

wherein the outer cover has a portion that covers or aligns with a sensor located in the robot body housing, when the outer cover has been fitted onto the housing, and that is designed to be sufficiently translucent or that is a cutout through which light used by sensor can pass to enable the sensor to continue functioning even though it is covered by the portion of the outer cover.

6. A character skin for a toy robot, comprising:

an outer cover that can be fitted onto a robot body housing of a self-propelled toy robot and then removed from the housing, the outer cover includes an identifier that provides an identification of a robot character software program, a power supply bus interface integrated in the outer cover that is to connect with a counterpart bus interface in the robot body housing to form a wired power supply link, when the outer cover has been fitted onto the robot body housing; and an energy harvesting unit coupled to the bus interface in the outer cover, to supply power to electronics in the robot body housing, through the wired power supply link; and wherein, when the outer cover Is fitted onto the robot body housing, the toy robot electronically detects the identification and executes the robot character software program which changes behavior of the toy robot.

7. The character skin of claim 4 wherein the outer cover further comprises:
- a sensor;
- a serial communications and power supply bus interface integrated in the outer cover that is to be connected with a counterpart bus interface in the robot body housing to form a wired communications link and a wired power supply link, when the outer cover has been fitted onto the robot body housing; and
- control logic coupled to the sensor and to the bus interface integrated in the outer cover,
- wherein the sensor and the control logic, and circuitry of the bus interface in the outer cover are all powered through the power supply link, and
- wherein the control logic receives commands from the processor in the robot body housing, for reading output data of the sensor, and sends output data of the sensor to the processor in the robot body housing, through the communications link.

* * * * *